3,319,895
ELASTOMER GRINDING
Frank R. Williams, Quincy, and Erivan Hagopian, Newton, Mass., assignors to Cabot Corporation, Boston, Mass., a corporation of Delaware
No Drawing. Filed May 26, 1965, Ser. No. 459,098
10 Claims. (Cl. 241—17)

This invention relates to a process for the size reduction of elastomers. More particularly, this invention relates to the production of elastomeric dust in the sub-micron range.

Obtaining elastomer dust in the sub-micron range has been desirable for a number of reasons. One important application for such a dust is in the investigation of the effect of the dust on health. Such investigations have been made desirable by the possibility that tremendous quantities of such dust, running into tons per day, may be becoming dispersed into the air of some of our larger metropolitan areas from abrading automotive tires.

Other applications for such small particle size material are in paints, varnishes, paper coatings and the like in which fast and uniform solvation or dispersion of elastomeric resins are important.

In attempting to produce dusts of sufficiently small particle size, a large number of problems have been encountered. For example, the energy imparted to a particle during grinding particle is partially dissipated as heat energy which tends to raise the temperature of the elastomer until it gums up the grinding mill.

Furthermore, there is always some increase in the temperature of the elastomer being processed and this severely limits the number of times a given particle may be "hit" in an attempt to reduce its size. Thus in most grinding machines it is difficult if not impossible to allow the elastomer to remain in the machine long enough to be reduced to an acceptable size level.

Therefore, it is an object of the present invention to provide a process for making an elastomeric dust having a particle size of less than 10 microns.

It is a further object of the invention to provide a process for making an elastomeric dust having a large quantity of particles having a diameter of less than one micron.

Another object of the invention is to provide a rubber dust having a large quantity of sub-micron particles therein.

Still another object of the invention is to provide a method for size reduction of elastomers by providing therein a large quantity of elastomer-solid interface area.

Other objects of the invention are in part obvious and in part pointed out hereinafter.

The aforementioned objects have been substantially achieved by providing a process whereby elastomeric compositions are subjected, at temperatures below the brittle points thereof, to impact with one another during a single pass through a fluid energy mill. The brittle points of elastomer compositions will differ depending on the molecular weight, degree of crosslinking and materials with which the elastomer is compounded. However, in general they will approximate the secondary transition temperature of the polymer. In practice, it is suggested that temperatures of elastomeric feed be well below this brittle point to assure proper processing through the fluid-energy grinder.

It is believed that the process is facilitated by the dispersal of small particle size solid such as carbon black in the elastomer to be comminuted. Such solids not only contribute interfacial surfaces subject to fracturing action, but also help to raise the low-temperature modulus of the material being ground.

In the process of the invention, rubber which has first been subjected to grinding by methods known to the art to a small particle size (material that will pass U.S. Standard 18 mesh is advantageously utilized), is chilled in liquid nitrogen to a temperature of about 190° C. and then passed through a fluid-energy grinding mill.

Fluid-energy grinding mills are those wherein particles moving at high speeds grind each other by impact upon one another. The particles are propelled by, and carried in, a gas stream such as air or steam. Air is economically utilized for the purposes of the instant invention. Because of the quick passage of the material through the machine in a gaseous carrier, there is insufficient heat generated to raise elastomer temperatures to the point where tough, non-brittle elastomer resists fragmentation on impact.

Removal of the larger rubber particles by preliminary screening is advantageous when using such fluid-energy mills because the design of such mills often utilizes a centrifugal principle to keep oversize particles in the grinding zone. Any significant degree of such retention of elastomers such as rubber would only subject the material to an increase in temperature and thereby tend to interfere with the effectiveness of the operation. Preferably, therefore, only particles which pass through an 18 mesh screen are fed into the size-reducing apparatus.

A fluid-energy mill found to be convenient for use in the process of the invention is sold under the trade name Micronizer by the Sturtevant Mill Co. The 2-inch and 4-inch Micronizer mills were both utilized successfully. Other fluid-energy mills can be selected by those skilled in the art upon reading the disclosure of the instant invention and the mode of operation disclosed herein.

Run 1

Rubber stripped from tires (and thus containing about thirty percent carbon black and ten percent of other adjuvants known to the art) was subjected to a conventional size reduction process and classified by screening.

That part of the ground material which passed through an 18-mesh screen was cooled in liquid nitrogen to approximately −196° C. The cooled material was then fed into the fluid energy grinding machine, a 4-inch Micronizer at rates varying from 10 to 12 pounds per hour. The fluid carrier was air which had been compressed to 100 p.s.i.g. and cooled to about 70° F. before entering the grinding zone.

All of the grind was removed over the top of the fluid-energy grinder, i.e. into the usual receptacle for fines. The compartment normally used for collecting grind product was blocked off.

Microscopic analysis of the ground samples revealed that 90 percent of the particles were less than 20 microns in diameter and 10 percent of the particles were of sub-micron size, i.e. less than a micron in diameter. A majority of the particles were below 10 microns in diameter.

Run 2

The fine product produced in Run 1 was again cooled in nitrogen and again passed through the fluid-energy grinder. Although the quantity of particles exceeding 20 microns in size was not substantially changed, there was a marked decrease in the number of particles of less than about five microns in diameter. This decrease in yield of low micron material, and especially sub-micron material, is believed to be caused by a re-agglomeration of the smaller particles during the nitrogen-cooling operation.

Run 3

Run 1 was repeated except that the feed was material which had been passed through only a 10-mesh screen. Only a small part of the ground product had a particle size of 10 microns or less. Clearly particle size of the feed is important to the successful carrying out of the process of the invention.

Run 4

Run 1 was repeated using Dry Ice and the ground material was cooled to −78° C. The run was unsuccessful in producing the desired small particle sized rubber. This is believed to have been due to the rubber being heated above the brittle point in the Micronizer.

Run 5

An impact mill wherein the material being ground is subjected to attrition by being continuously hit with rotating hammers was utilized. The mill was sold under the trade name Bantam SH Mikropulverizer by Pulverizing Machinery Co. Feed material was rubber cooled as described in Run 1, and which had been passed through an 18-mesh screen as in Run 1. Feed rate was 10 lbs. per hour and a retaining screen with 0.037 inch openings was used with the pulverizer. A screen analysis of the material:

| Size | Percent by weight |
|---|---|
| Larger than 500 microns | 60 |
| 500–250 microns | 26 |
| Smaller than 250 microns | 14 |

Clearly such impact mills are not useful for achieving the objects of the invention.

The aforesaid grinding runs have been presented to describe a particularly advantageous application of the instant invention and to point out the importance of various aspects of the process of the invention. However, the above description is intended to be illustrative only and the various changes can be made as to specific fluid-energy grinding mills, and operating conditions used therewith without departing from the spirit of the invention as defined in the appended claims.

What is claimed is:

1. A process for making rubber dust containing 90% particles having a diameter of less than 20 microns and containing at least 10% particles having a sub-micron diameter comprising cooling a rubber preground to pass through about an 18-mesh screen to below the brittle point thereof, grinding said cooled rubber in a fluid energy grinding mill in a stream of gas while still below said brittle point, and collecting the resulting grind from said mill.

2. A process for making elastomeric dust containing a substantial portion of sub-micron particles comprising cooling an elastomer preground to pass through about an 18-mesh screen to below the brittle point thereof, grinding said cooled elastomer in a fluid-energy grinding mill in a stream of gas while still below said brittle point and collecting ground elastomer from said mill.

3. A process for making elastomeric dust containing a substantial portion of sub-micron particles comprising cooling an elastomer preground to below the brittle point thereof, grinding said cooled elastomer in a fluid-energy grinding mill in a stream of gas while still below said brittle point and collecting ground elastomer from said mill.

4. A process for making elastomer dust containing 90% particles having a diameter of less than 20 microns and containing at least 10% particles having a sub-micron diameter comprising cooling elastomer preground to pass through about an 18-mesh screen to below the brittle point thereof, grinding said cooled elastomer in a fluid-energy grinding mill in a stream of gas while still below said brittle point, and collecting the grind from said mill.

5. A process for making rubber dust containing a substantial portion of sub-micron particles comprising cooling a rubber preground to pass through about an 18-mesh screen to below the brittle point thereof, grinding said cooled rubber in a fluid-energy grinding mill in a stream of gas while still below said brittle point, and collecting ground rubber from said mill.

6. A process os defined in claim 5 wherein said gas is compressed air.

7. The process as defined in claim 3 wherein said elastomer has dispersed therein a small particle sized material.

8. The process as defined in claim 7 wherein said small particle sized material is carbon black.

9. The process as defined in claim 5 wherein said rubber has dispersed therein a small particle sized material.

10. The process as defined in claim 9, wherein said small particle sized material is carbon black.

References Cited by the Examiner

UNITED STATES PATENTS

| | | | |
|---|---|---|---|
| 1,542,346 | 6/1925 | Hoover | 241—18 XR |
| 2,665,568 | 1/1954 | Meyer | 241—18 XR |
| 3,241,774 | 3/1966 | Jackering | 241—18 XR |

WILLIAM W. DYER, JR., *Primary Examiner.*

H. J. PEPPER, JR., *Assistant Examiner.*